United States Patent [19]
Rosson

[11] Patent Number: 6,030,129
[45] Date of Patent: Feb. 29, 2000

[54] FIBER OPTIC CONNECTOR AND AN ASSOCIATED METHOD OF FABRICATION

[75] Inventor: Joel C. Rosson, Hickory, N.C.

[73] Assignee: Siecor Operations, LLC, Hickory, N.C.

[21] Appl. No.: 09/330,490

[22] Filed: Jun. 11, 1999

Related U.S. Application Data

[62] Division of application No. 08/829,582, Mar. 31, 1997, Pat. No. 5,923,804.

[51] Int. Cl.$^7$ ..................................................... G02B 6/36
[52] U.S. Cl. ................................................................ 385/81
[58] Field of Search ................................ 385/76–94, 147

[56] References Cited

U.S. PATENT DOCUMENTS

| | | | |
|---|---|---|---|
| 5,418,874 | 5/1995 | Carlisle et al. | 385/76 |
| 5,436,994 | 7/1995 | Ott et al. | 385/78 |
| 5,748,819 | 5/1998 | Szentesi ert al. | 385/60 |
| 5,862,289 | 1/1999 | Waltet et al. | 385/134 |
| 5,923,804 | 7/1999 | Rosson | 385/81 |
| 5,943,460 | 8/1999 | Mead et al. | 385/81 |

*Primary Examiner*—Akm E. Ullah

[57] ABSTRACT

The fiber optic connector includes a crimp body defining a longitudinal bore extending between the first and second opposed ends of the crimp body. The fiber optic connector also includes a cylindrical shroud defining an internal bore in which a ferrule assembly is disposed. The internal bore extends longitudinally between the first and second opposed ends of the shroud. The first end of the shroud is connected to the second end of the crimp body such that the internal bore of the shroud opens into the longitudinal bore of the crimp body. The crimp body is preferably formed of a metal, while the shroud is preferably formed of a plastic material such that the first end of the shroud can be ultrasonically welded to the second end of the crimp body. In order to further secure the crimp body and the shroud, the second end of the crimp body can include a lip that extends radially outward to engage the first end of the shroud. The second end of the crimp body can also include a textured surface, such as a knurled surface, for further engaging the first end of the shroud. Additionally, the second end of the crimp body can define a circumferentially extending groove, typically positioned between the radially extending lip and the textured surface, for interlocking the crimp body and the shroud following ultrasonic welding.

8 Claims, 4 Drawing Sheets

FIBER OPTIC CONNECTOR AND AN ASSOCIATED METHOD OF FABRICATION

This Appln is a Division of application No. 08/829,582, filed Mar. 31, 1997, now U.S. Pat. No. 5,923,804.

FIELD OF THE INVENTION

The present invention relates generally to optical fiber connectors and associated methods of fabrication and, more particularly, to compact fiber optic connectors adapted for automated assembly and their associated methods of fabrication.

BACKGROUND OF THE INVENTION

With the ever increasing demand for optical fibers and, therefore, fiber optic connectors, more cost effective designs of connectors are being sought as well as more efficient methods of producing them. Preferably, the new connector designs must be compatible with automated production methods in order to minimize costs and increase the supply of connectors in order to meet the ever increasing demand. Additionally, because the space which is available for the fiber optic cable and connectors is usually limited, the size of the connectors should be minimized to the extent possible while maintaining strength and durability necessary to survive the frequent connects and disconnects from panels and other connectors.

Consequently, a number of optical fiber connectors have been developed in an attempt to meet these design considerations but significant improvement in connector design remains to be realized. For example, three well-known types of fiber optic connectors are the ST ("ST" is a trademark of AT&T), SC, and FC connectors. The ST connector incorporates a bayonet-style fastener which includes a coupling having one or more outwardly extending projections and a rotatable female socket. The female socket has a spiral slot for receiving the projections. The SC type connector has a rectangular cross-section but has components similar to the ST connector, including a ferrule, a collar, a spring, a crimp ring, and a boot. The FC connector has a circular shell similar to the ST connector. The FC also includes a ferrule, a ferrule collar, a spring, a shell, a crimp ring, and an outer housing.

Examples of these three types of connectors are disclosed in U.S. Pat. No. 5,321,784 to Cubukciyan et al. Cubukciyan et al. is directed to a system for manufacturing a variety of fiber optic connectors which are compatible with existing connector formats, including FC, SC, and ST push-pull connectors. The system includes a connector subassembly which is constructed of components common to the FC, SC, and ST connector designs. The connector subassembly includes a ferrule and ferrule collar contained in a connector body, a spring biasing the collar toward the ferrule, a crimp ring for securing the strength members of the fiber optic cable to the connector body, and a boot for strain relief at the crimp location. Several different connector shells are provided for each of the connector formats or types (i.e., FC, SC and ST) and the interior of the shells are adapted to be attached to the single connector body. The Cubukciyan patent discloses that all of the parts in the connector subassembly snap together. While the snap-together feature may minimize parts, it may not result in a rugged, durable connector, especially if the key parts such as the crimp body and housing are made of plastic.

An early FC type connector manufactured by Siecor Corp. of Hickory, N.C., the assignee of the present invention, is shown in FIG. 1. The connector 10 includes, a crimp body 11, a spring 12, a ferrule assembly 13, a coupling nut 14, a bushing 15, and a keying ring 16. The crimp body and the bushing must be milled on a CNC machine which is relatively costly. Additionally, the method of assembly of this connector is not susceptible to automation because the parts cannot be assembled in a top-down or bottom-up fashion. That is, the parts cannot be assembled in a successive fashion in one direction, e.g. by stacking, so that the assembly of this FC connector is not amenable to automated assembly.

A more recent version of the FC connector manufactured by Siecor Corp. is shown in FIG. 2A. This connector includes an extended crimp body 35, a coupling nut 36, a ferrule assembly 37, an outer clip 38, and an inner clip 39. The ferrule assembly is retained in the crimp body by the inner clip 39 while the coupling nut is retained on the extended crimp body between a collar on the extended crimp body and the outer clip 38.

Yet another version of an FC type connector manufactured by Siecor Corp. is shown in FIG. 2B. This connector includes a ferrule assembly 20, an inner clip 21, a spring 22, an extended crimp body 23 having a first end 24 and a second end 25, a coupling nut 26, an outer "C" clip (not shown), and a fiber guide (lead in) tube 28. The ferrule assembly 20 is held inside of the extended crimp body 23 by the inner clip 21 while the coupling nut 26 is slidably mounted on the extended crimp body between the outer "C" clip mounted on the first end 24 of the crimp body and an outwardly extending collar 30 disposed near the second end 25 of the extended crimp body. The particular features of the extended crimp body, specifically the key 31 disposed on the extended crimp body between the second end and the collar as well as one or more notches 33 on the extended crimp body near the first end, require that the crimp body be manufactured on a CNC machine which is more costly and time consuming than parts manufactured on a screw machine having multiple spindles for manufacturing multiple parts at one time. Additionally, because inner and outer clips are used to assemble the ferrule assembly within the extended crimp body and the extended crimp body within the coupling nut, this connector cannot be assembled in bottom-up or top-down fashion.

While more recent connector designs may have less components that the early designs, none of the above designs provide a durable fiber optic connector capable of fully automated assembly. Since large numbers of fiber optic connectors are manufactured every day, the inefficiencies created by assembly processes that are less than fully automated can quickly result in significantly increased fabrication times and fabrication costs.

SUMMARY OF THE INVENTION

It is therefore an object of the present invention to provide an improved fiber optic connector.

It is a more particular object of the present invention to provide a fiber optic connector that is more compact than conventional connectors, but that provides the necessary strength and durability.

It is another object of the present invention to provide a fiber optic connector that can be fabricated inexpensively and in fully automated manner.

It is a corresponding object of the present invention to provide an improved method for fabricating fiber optic connectors.

These and other objects are provided, according to the present invention, by a compact fiber optic connector that is capable of being manufactured and assembled in fully automated fashion as well as the corresponding method for fabricating the fiber optic connector. The fiber optic connector includes a crimp body defining a longitudinal bore extending between the first and second opposed ends of the crimp body. The fiber optic connector also includes a cylindrical shroud defining an internal bore extending longitudinally between the first and second opposed ends of the shroud. According to the present invention, the first end of the shroud is connected to the second end of the crimp body such that the internal bore of the shroud opens into the longitudinal bore of the crimp body. In this regard, the crimp body is preferably formed of a metal, while the shroud is preferably formed of a plastic material and, more preferably, a thermoplastic material such that the first end of the shroud can be ultrasonically welded to the second end of the crimp body, thereby coupling the crimp body and the shroud in an efficient and secure manner.

According to one advantageous embodiment, the second end of the crimp body includes a lip that extends radially outward to engage the first end of the shroud. The radially extending lip of the second end of the crimp body may be tapered to facilitate sliding the first end of the shroud over the second end of the crimp body. The second end of the crimp body can also include a textured surface, such as a knurled surface, for securely engaging the first end of the shroud. Further, the second end of the crimp body can define a circumferentially extending groove, typically positioned between the radially extending lip and the textured surface. According to this embodiment, the circumferentially extending groove serves to further interlock the crimp body and the shroud following ultrasonic welding which causes a portion of the first end of the shroud to extend into the groove and be engaged therein.

The fiber optic connector can also include a ferrule assembly having a lengthwise extending ferrule body and a ferrule holder attached to one end of the ferrule body and extending rearwardly therefrom. The ferrule holder includes a collar, a tapered section rearward of the collar, and a cylindrical tube rearward of the tapered section. The collar of the ferrule holder also preferably defines a slot. Correspondingly, the shroud preferably includes a key that extends radially into the internal bore for engaging the slot defined by the collar of the ferrule holder, thereby preventing relative rotation between the shroud and the ferrule holder. The shroud also preferably includes a ring extending radially into the internal bore for retaining the collar of the ferrule holder between the shroud ring and the second end of the crimp body.

The ferrule body and the attached ferrule holder each define a lengthwise extending bore. As such, an optical fiber can be inserted through the longitudinal bore of the crimp body and can be extended through the lengthwise extending bores of the ferrule holder and the ferrule body. The optical fiber can thereby be exposed through the first end of the ferrule body in preparation for subsequent connection to another optical fiber. A lead in tube having first and second opposed ends may be inserted into the longitudinal bore of the first end of the crimp body to facilitate the insertion of the optical fiber into the bore of the ferrule body. The lead in tube is preferably flared at one of the ends so that the optical fiber can be more easily inserted into the lead in tube.

Both the crimp body and the shroud can also include respective outwardly extending collars of a predetermined diameter. In addition, the fiber optic connector can include a coupling nut. The coupling nut defines a lengthwise extending bore having a interior diameter that is less than the respective predetermined diameters of the collars of the crimp body and the shroud. As a result, the coupling nut can be slidably mounted upon the shroud between the collar of the shroud and the collar of the crimp body.

As a result of the construction of the fiber optic connector of the present invention, the length of the fiber optic connector is less than conventional fiber optic connectors. However, even though the fiber optic connector is more compact, the strength and durability of the fiber optic connector is comparable to the strength and durability of conventional fiber optic connectors and exceeds the demands of most, if not all, connector applications.

As a result of the unique design of the fiber optic connector, the fiber optic connector can also be assembled in a more efficient manner than conventional connectors. For example, the fiber optic connector of the present invention can be assembled from one end by mounting the shroud in an assembly fixture such that the first end of the shroud is exposed and by thereafter placing the other components of the fiber optic connector either about the first end of the shroud or into the first end of the internal bore of the shroud.

Initially, the ferrule assembly is inserted into the first end of the internal bore of the shroud and is rotated relative to the shroud so that the slot defined by the collar of the ferrule assembly interlocks with the key extending radially into the internal bore of the shroud, thereby preventing further relative rotation of the ferrule assembly and the shroud. A spring is then placed over the ferrule assembly and inside of the first end of the internal bore of the shroud. A coupling nut is thereafter placed over the first end of the shroud and the second end of the crimp body is then aligned with the first end of the shroud. Once the second end of the crimp body has been brought into contact with the first end of the shroud, the second end of the crimp body and the first end of the shroud can be connected such that the ferrule assembly, the spring and coupling nut are retained by the resulting fiber optic connector.

In the advantageous embodiment in which the crimp body is formed of a metal material and the shroud is formed of a plastic and, more preferably, a thermoplastic material, the second end of the crimp body can be ultrasonically welded to the first end of the shroud. As a result, the fabrication process of the present invention securely connects the crimp body and the shroud in an efficient and repeatable manner without requiring the various components of fiber optic connector to include threads, bosses, clips, and other similar mechanical coupling features, thereby reducing the number of parts that must be milled on a CNC machine. Preferably, the shroud and the crimp body are ultrasonically welded until the first end of the shroud and the second end of the crimp body overlap by a predetermined distance. The predetermined overlap distance is advantageously defined as the longitudinal distance between the outwardly extending collar of the crimp body and the second end of the crimp body.

By assembling the fiber optic connector from one end, the fiber optic connector is fabricated more efficiently. In addition, the assembly and manufacture of the fiber optic can be readily automated to further increase fabrication efficiency. Moreover, by ultrasonically welding the crimp body and the shroud, the crimp body and the shroud are securely connected in a manner which retains the other components of the fiber optic connector, namely, the ferrule assembly, the spring and the coupling nut, in their proper relative positions.

BRIEF DESCRIPTION OF THE DRAWINGS

FIG. 3A is a cross-sectional side view of the embodiment of the connector of the present invention shown in FIG. 3 which illustrates the connection of the various components.

FIG. 3B is a cross-sectional side view of the shroud shown in FIG. 3 illustrating the collar, inner lip, and key.

FIG. 3C is a cross-sectional side view of the crimp body shown in FIG. 3 illustrating the lip, groove and textured surface.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein. Like numbers refer to like elements throughout.

Figure 1:
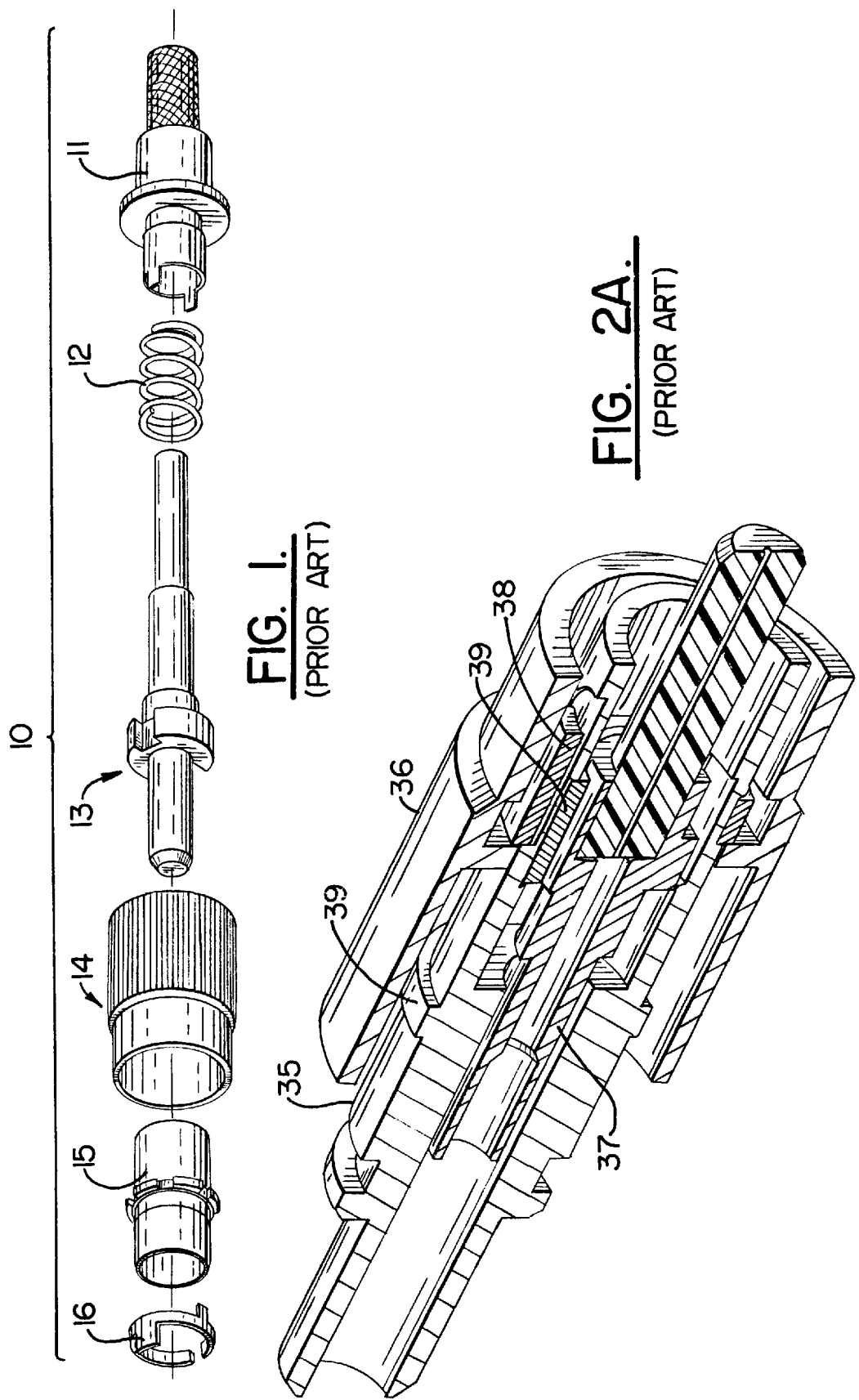
FIG. 1 is an exploded perspective view of an FC connector manufactured and sold by Siecor Corporation illustrating the various components of the connector, including the ferrule assembly, an inner clip, a spring, an extended crimp body, a coupling nut, and an outer clip and the order and direction of the assembly of the components.
Figure 2:
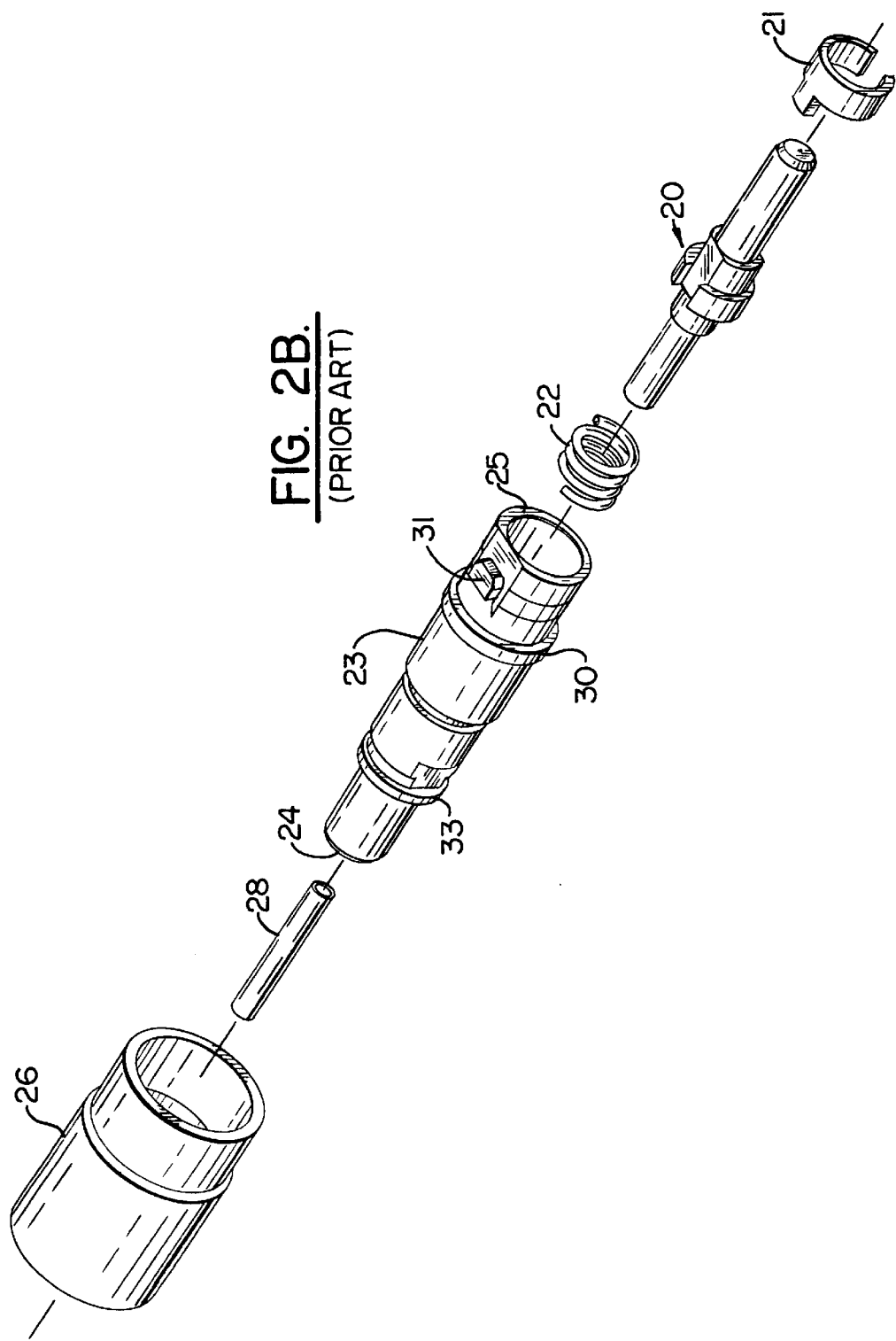
FIG. 2A is a cross-sectional perspective view of an FC connector manufactured and sold by Siecor Corporation illustrating the various components of the connector, including a ferrule assembly, a spring, an extended crimp body, and a coupling nut and the order and direction of the assembly of the components.
FIG. 2B is an exploded perspective view of another version of the FC connector shown in FIG. 2A illustrating the various components of the connector, including a ferrule assembly, an extended crimp body, a coupling nut, and inner and outer clips.
Figure 3:
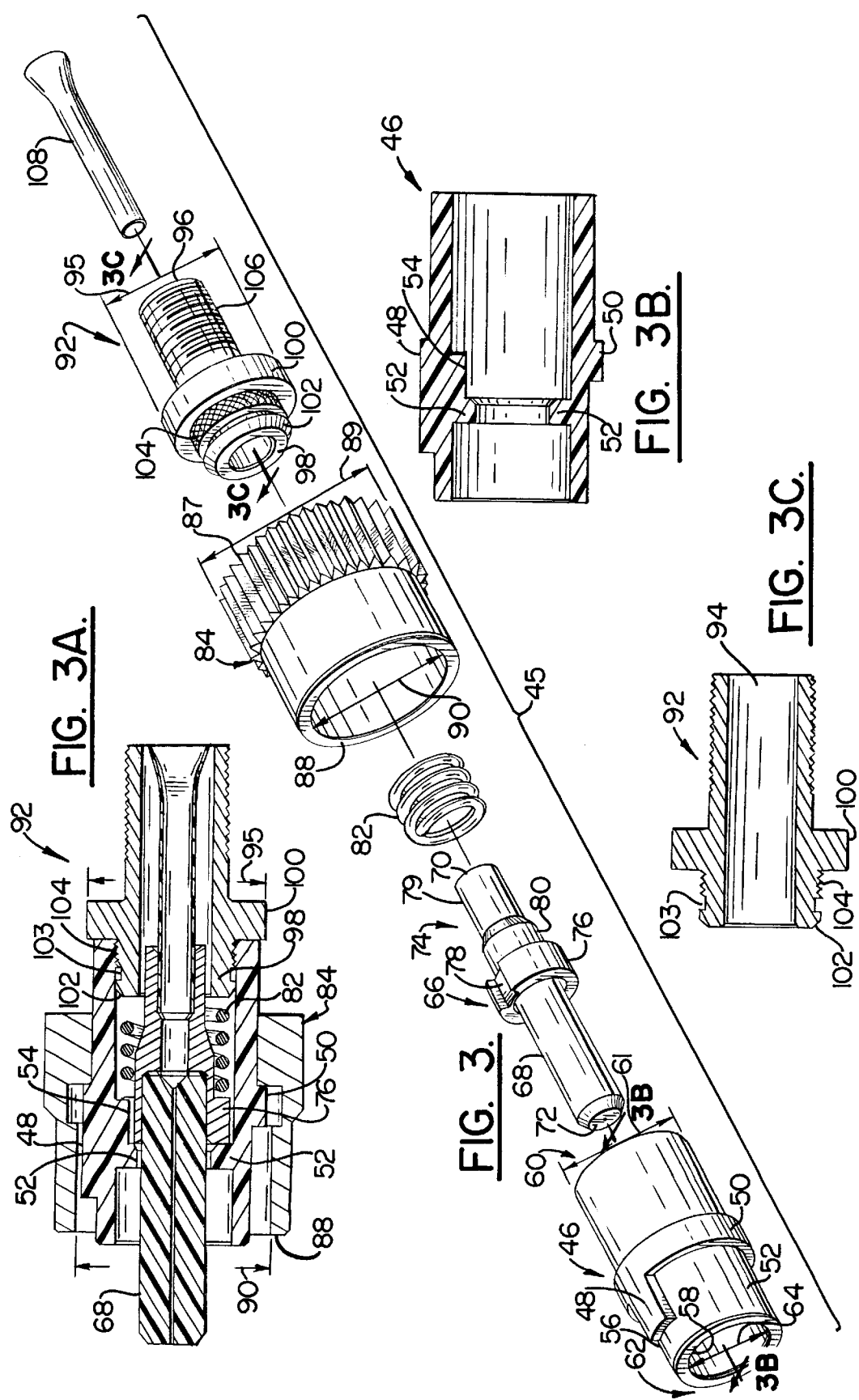
FIG. 3 is an exploded perspective view of one embodiment of an optical fiber connector of the present invention illustrating the various components of the connector.

Referring now to FIG. 3, an optical fiber connector 45 according to one embodiment of the present invention is illustrated in an exploded perspective view. While the connector of the present invention will be described and illustrated in conjunction with an FC type connector, the connector can be of other types, such as the SC connector, without departing from the spirit and scope of the present invention. The optical fiber connector includes a shroud 46, a ferrule assembly 66, a spring 82, a coupling nut 84, a crimp body 92, and a lead in tube 108. Although not shown, the fiber optic connector can be mounted on the end portion of an optical fiber that extends through the lead in tube and the ferrule assembly for subsequent connection to another fiber optic connector. The lead in tube 108 having first and second opposed ends may be inserted into the longitudinal bore of the first end of the crimp body 96 to facilitate the insertion of the optical fiber into the bore of the ferrule body 68. The lead in tube 108 is preferably flared at one of the ends so that the optical fiber can be more easily inserted into the lead in tube, especially when an automated assembly process is used to assembly the connector 45.

The longitudinally extending shroud 46 has an outer surface 56 and an inner surface 58 extending between first and second opposed ends 60, 62, respectively. The shroud is preferably cylindrical in shape. The inner surface of the shroud defines a bore and includes a ring 52 extending into the bore between the first and second ends of the shroud. As shown more clearly in FIG. 3B, the inner surface of the shroud may also include an inwardly extending key 54 for engaging a slot 78 on the ferrule assembly 66 thereby preventing the ferrule assembly from rotating relative to the shroud. In a preferred embodiment, a connector alignment key 48 also extends outwardly from the outer surface 56 of the shroud. The outer surface 56 of the shroud includes an outwardly extending circumferential collar 50. The shroud is preferably molded or formed of a thermoplastic material, such as ULTEM ("ULTEM" is a registered trademark of General Electric) plastic so that a portion of the shroud can be re-melted for attachment to the crimp body as described further hereinbelow.

The connector also includes a ferrule assembly 66. The ferrule assembly includes a lengthwise extending ferrule body 68, preferably made of zirconia, having a first end 70 and a second end 72. The ferrule assembly further includes a ferrule holder 74 disposed on one of the ends of the ferrule body so as to extend rearwardly therefrom. The holder includes a collar 76, a tapered section 80 adjacent or rearward of the collar, and a cylindrical tube 79 adjacent or rearward of the tapered section. The ferrule holder is connected to one of the ends of the ferrule body, preferably by an epoxy resin or other suitable means, so that the collar 76 is rearward of the second end 72 of the ferrule body 68.

The ferrule assembly is disposed in the shroud so that the ferrule body 68 extends through the inwardly extending ring 52 of the shroud to allow the ferrule holder collar 76 of the ferrule assembly 66 to contact the ring 52 thereby retaining the ferrule assembly within the connector. In a preferred embodiment, the collar includes a single slot 78, although the collar can include more than one slot if desired. The slot of the collar is adapted to mate with the inwardly extending key 54 of the shroud 46 in order to prevent the ferrule assembly from rotating relative to the shroud. As explained below, during the assembly of the connector components, the ferrule assembly is rotated until the inwardly extending key 54 of the shroud 46 engages the slot 78 of the ferrule holder collar 76.

The connector also generally includes a spring 82 which is disposed over the cylindrical tube 79 of the ferrule holder 74. The diameter of the spring is less than the diameter of the first end 60 of the shroud 46 so that the spring fits inside of the first end of the shroud. The spring urges the ferrule assembly 66 against the ring 52 of the shroud so that the ferrule body 68 extends through the second end of the shroud so as to be in a position to cooperatively engage a ferrule body of a second connector.

A coupling nut 84 defining a lengthwise extending bore 86 and having first and second opposed ends 87, 88 is mounted upon the shroud 46. The bore of the coupling nut has a stepped diameter with both inside diameters 89, 90 of the coupling being slightly greater than the outside diameter 61 of the shroud so that the coupling nut is slidably mounted over the first end 60 of the shroud. The inside diameter 89 of the first end 87 of the coupling nut is sized so that the first end of the nut contacts the collar 50 of the shroud thereby retaining the coupling nut on the first end of the shroud. The inside diameter 90 of the second end 88 of the coupling nut is larger, however, so that the second end of the coupling nut extends over the collar 50 for mating with a fiber optic connector coupler (not shown). In a preferred embodiment, the inside surface 86 of the coupling nut is threaded so that the coupling nut can engage the connector coupler. The coupling nut is preferably made of a metal for maximum strength and durability. However, due to its simple design, the coupling nut may also be fabricated out of plastic.

In a preferred embodiment shown more clearly in FIG. 3A, the shroud 46, ferrule assembly 66, spring 82, and coupling nut 84 are held in their respective positions by a crimp body 92 which includes a first end 96 and a second end 98. Preferably, the crimp body defines a longitudinal bore 94 for receiving an optical fiber (not shown). The crimp body is securely connected to the shroud by ultrasonic welding or other suitable means. Ultrasonic welding essentially involves heating one or both parts to be welded together using the friction generated by vibration of the parts against each other. As shown in FIG. 3A, the second end 98 of the crimp body 92 is connected, such as by ultrasonic welding, to the first end 60 of the shroud 46. A circumferential collar 100 extends radially outwardly from a medial portion of the crimp body between the first and second ends. The diameter 95 of the crimp body collar is less than the inside diameter 90 of the second end 88 of the coupling nut and slightly greater than the inside diameter 89 (FIG. 3) of the first end 87 of the coupling nut. Additionally, the diameter of the crimp body collar may be slightly greater than outside diameter 61 of the shroud so that the first end 60 of the shroud contacts the collar 100 during the ultrasonic welding operation illustrated in FIG. 5 and so that the coupling nut is slidably retained on the shroud 46.

In a preferred embodiment shown in FIGS. 3 and 3C, a lip 102 is disposed on the second end 98 of the crimp body 92 to facilitate anchoring the first end 60 of the shroud to the second end 98 of the crimp body. Preferably, the lip extends radially outward and is tapered in order to facilitate the insertion of the shroud over the second end of the crimp body. The crimp body may further include a textured or raised surface 104 on the second end 98 which provides a suitable surface for anchoring the first end 60 of the shroud on the second end of the crimp body. In a preferred embodiment, the raised surface is knurled, rough or uneven to further enhance the bond between the shroud 46 and the crimp body 92. The second end of the crimp body can also define a circumferentially extending groove 103 positioned between the lip and the textured surface. As described below, the groove provides an additional feature for interlocking the first end of the shroud with the second end of the crimp body. The crimp body may also include a threaded portion 106 on the first end 96. As with the coupling nut 84, the crimp body is preferably made of metal. The crimp body's simple design also allows the crimp body to be mass produced on a screw machine instead of a CNC machine as required with the crimp body of prior connectors.

Figures 4, 5:
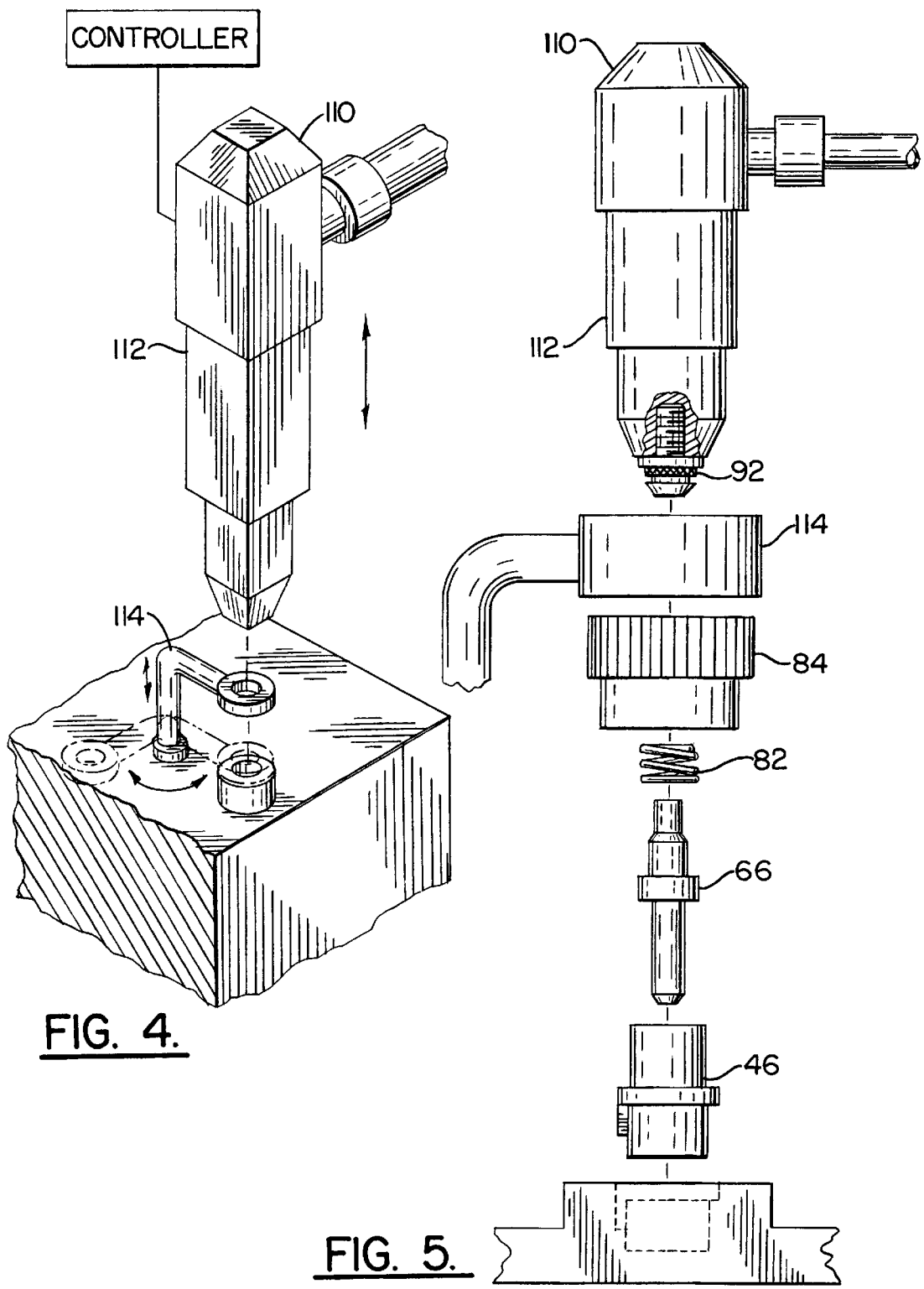
FIG. 4 is a perspective view illustrating the ultrasonic welding machine used to assemble one embodiment of the optical fiber connector of the present invention illustrated in FIG. 3.
FIG. 5 is a fragmentary elevation view of the ultrasonic welding machine of FIG. 4 that illustrates one embodiment of the method of assembling the fiber optic connector of the present invention shown in FIG. 3.

As illustrated in FIG. 5, the connector of the present invention is designed to be fully assembled by automation, as opposed to hand assembly required by many of the prior art connectors, because the various components may be assembled in a bottom-up fashion. That is, the shroud 46, ferrule assembly 66, spring 82, coupling nut 84, crimp body 92 are assembled in successive fashion by simply stacking the parts beginning with the shroud. The assembly process is completed by welding the crimp body onto the shroud, as described further hereinbelow, which eliminates the additional parts or milled features, such as clips, keys, or bosses used to assemble conventional connectors. The assembly process using ultrasonic welding allows the use of a molded plastic shroud, thereby eliminating the more expensive metal shroud which must be milled a CNC machine because of the keys and other features. Thus, the cost of the connector is minimized by incorporating the keys 48, 54 and inner collar 52 on the molded plastic and not on the metal crimp body 92.

More specifically, the preferred method of assembly begins by placing the second end 62 of the shroud 46 in the bottom holder of an ultrasonic welding machine 110 such as a Branson 901 Series ultrasonic welding machine shown in FIG. 4. The second end 72 of the ferrule assembly 66 is placed in the internal bore of the shroud so that the collar 76 of the ferrule assembly contacts the inner ring 52 of the shroud. The ferrule assembly or the shroud may be rotated within the bore so that the slot 78 in the collar 76 of the ferrule assembly mates with the inwardly extending key 54 of the shroud. The spring 82 is then placed over the first end 70 of the ferrule assembly and inside of the bore of the shroud. The second end 88 of the coupling nut 84 is then placed over the first end 60 of the shroud. If not performed earlier, the first end 96 of the crimp body 92 is then inserted into the top portion of the ultrasonic welding machine where it is held partially inside of an orifice by a vacuum.

Once the components have been stacked, the machine is then activated so that an arm 114, including a horizontal ring on the end, swings over and clamps down on the coupling nut thereby holding the coupling nut and shroud in position while the second end 98 of the crimp body 92 is lowered into contact with the first end 60 of the shroud during the welding process. Using the clamp and coupling nut to hold the shroud in place prevents damaging, including forming flash, on the second end of the shroud during the welding process. The welding process continues until the second end of the crimp body has been inserted a predetermined distance, such as about 1 to 5 mm, into the shroud. In one advantageous embodiment, the predetermined distance is equal to the longitudinal distance between the front of the second end 98 of the crimp body and the crimp body collar 100 such that the crimp body collar serves as a stop during the welding process. In a preferred embodiment, the welding process terminates prior to the second end of the crimp body contacting the crimp body collar; however, the horn 112 of the welding machine continues to advance until the first end of the shroud contacts the crimp body collar. The ultrasonic welding machine may also be set to weld the crimp body onto the shroud for a predetermined period of time.

The cross-section of the assembled fiber optic connector, FIG. 3A, illustrates the bond between the first end 60 of the shroud 46 and the second end 98 of the crimp body 92. The rapid vibration of the ultrasonic welding operation heats and softens the first end of the shroud, preferably made of ULTEM thermoplastic, so that the first end of the shroud deforms over the tapered lip 102 of the crimp body and the raised area 104 of the crimp body. The thermoplastic material of the shroud may fill, partially or completely, the groove 103 formed between the lip and the raised area thereby providing additional anchoring of the shroud to the crimp body.

Once the shroud and the crimp body are connected, the spring 82 is held within the shroud and urges the ferrule assembly 66 against the ring 52 of the shroud. The coupling nut 84 is also slidably mounted on the shroud between the collar 50 of the shroud and the collar 100 of the crimp body thereby allowing the coupling nut to be threaded onto the FC connector coupler (not shown). The preferred embodiment of the connector of the present invention has fewer, smaller, and less detailed parts than prior connectors, and is, therefore, more compact than previous designs. For example, the crimp body of the present invention is shorter and has milled features found on the crimp bodies of conventional connectors. While the connector of the present invention is smaller and shorter than other conventional connectors, the connector is just as durable and strong as conventional connectors. Additionally, features such as keys which must be milled if included in metal parts, may be molded on the plastic shroud thereby reducing the connector's cost.

As described above, a fiber optic connector of the present invention can be readily fabricated and completely assembled by automation. In particular, the coupling nut 84 and the crimp body 92 can be easily fabricated on a screw machine instead of a slower and more expensive CNC machine because these components have no milled features. Likewise, the ferrule assembly may be fabricated using a screw machine because the ferrule holder 74 has only one milled feature (slot 78). The shroud 46, including all of its features may be molded, preferably of thermoplastic. The configuration of the components also allows the connector of the present invention to be assembled in a bottom-up fashion as shown in FIG. 5 so that the process can be fully automated.

In the drawings and specification, there has been set forth a preferred embodiment of the invention and, although specific terms are employed, the terms are used in a generic and descriptive sense only and not for the purpose of limitation, the scope of the invention being set forth in the following claims.

That which is claimed:

1. A crimp body for mounting upon an end portion of an optical fiber, the crimp body comprising:

a metallic crimp body defining a longitudinal bore for receiving the end portion of the optical fiber, said metallic crimp body extending between first and second opposed ends, wherein the second end of said crimp body defines a circumferentially extending groove and a textured portion, proximate the circumferentially extending groove, for securely engaging an end portion of a shroud.

2. A crimp body of claim 1 wherein the second end of the crimp body comprises a radially extending lip to engage the end portion of the shroud.

3. A crimp body of claim 1 wherein the radially extending lip of the second end of the crimp body is tapered to facilitate mounting the end portion of the shroud upon the second end of the crimp body.

4. A crimp body of claim 1 wherein the textured portion of the crimp body is knurled for securely engaging the end portion of the shroud.

5. A shroud adapted to mount upon an end portion of a crimp body of a fiber optic connector, wherein the end portion of the crimp body has a predetermined outer diameter, the shroud comprising:

a shroud body formed of a thermoplastic material and extending lengthwise between first and second opposed ends, said shroud body defining an internal bore for receiving a ferrule assembly, wherein the internal bore defined by said shroud body has a predetermined inner diameter at the first end thereof that is less than the predetermined outer diameter of the end portion of the crimp body upon which the shroud is mounted.

6. A shroud of claim 5 further comprising a ring extending radially into the internal bore for limiting lengthwise movement of the ferrule assembly.

7. A shroud of claim 5 further comprising a key extending radially into the internal bore for engaging a portion of the ferrule assembly, thereby preventing relative rotation between the shroud and the ferrule assembly.

8. A shroud of claim 5 further comprising a collar extending radially outward from a medial portion of the shroud body.

* * * * *